J. A. BOWDEN.
DUST CAP AND ATTACHING MEANS THEREFOR.
APPLICATION FILED FEB. 21, 1919.
1,328,801.
Patented Jan. 20, 1920.
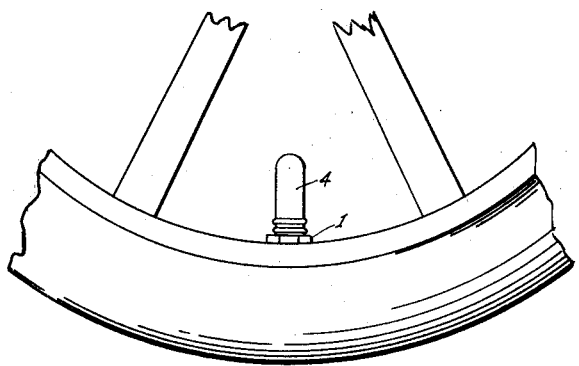
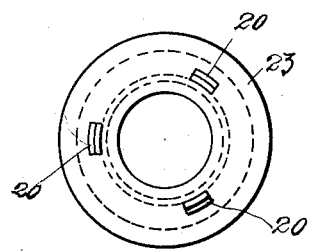
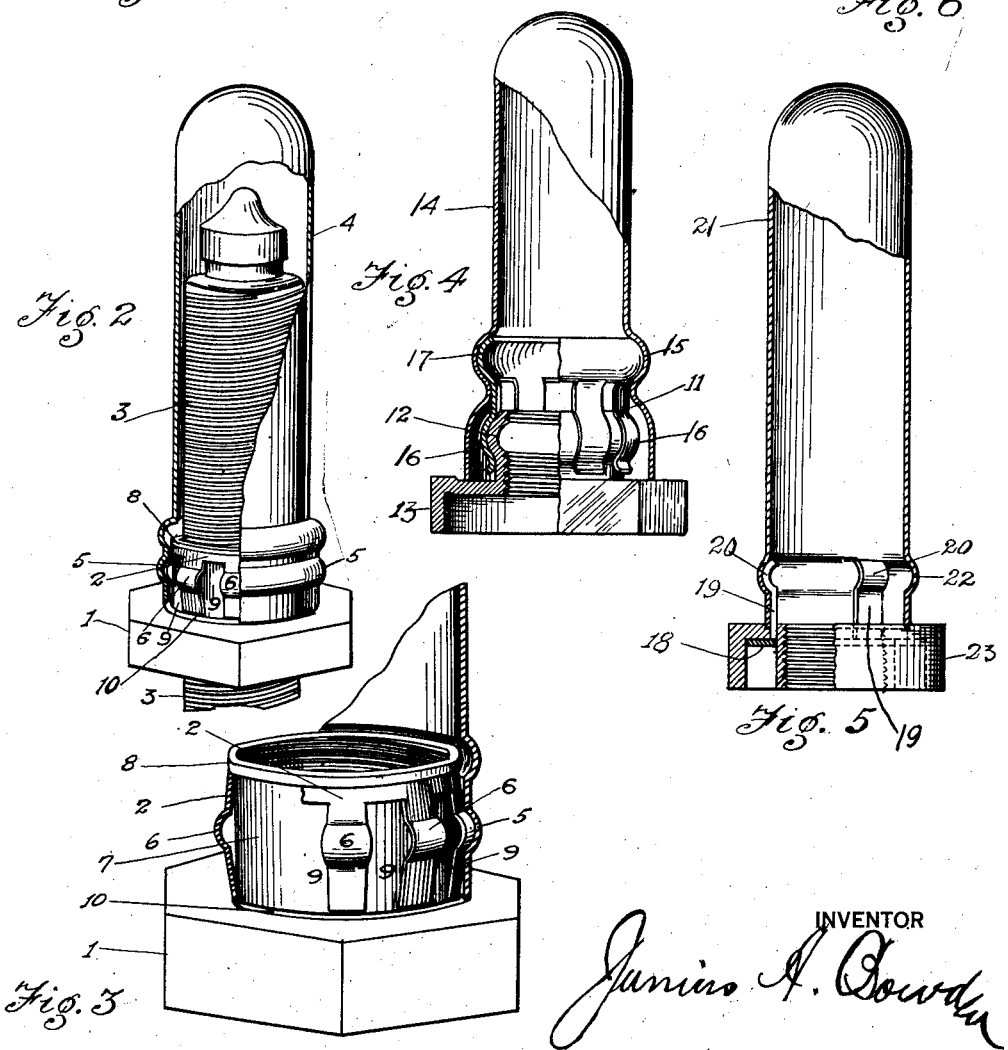
INVENTOR
Junius A. Bowden

UNITED STATES PATENT OFFICE.

JUNIUS A. BOWDEN, OF LOS ANGELES, CALIFORNIA.

DUST-CAP AND ATTACHING MEANS THEREFOR.

1,328,801.      Specification of Letters Patent.      Patented Jan. 20, 1920.

Application filed February 21, 1919. Serial No. 278,454.

*To all whom it may concern:*

Be it known that I, JUNIUS A. BOWDEN, a citizen of the United States, residing at Los Angeles, in the county of Los Angeles, State of California, have invented new and useful Improvements in Dust-Caps and Attaching Means Therefor, of which the following is a specification.

This invention relates to a quick detachable means for shielding the air inlet stem of tires.

The object is to provide a very much quicker operating and less expensive means for protecting the air inlet stems of tires than the common plan of screwing the dust caps upon the stems.

Further object and a very important feature of the invention is to provide such means that permits of using metal of less than half the weight of caps that are screwed upon the air inlet stems.

Referring to drawings, Figure 1, shows the cap and nut assembled and fitted on the air inlet stem of a tire. Fig. 2 shows the cap partially cut away exposing the neck of the nut and the annular spring held in the recess of the neck and the upper end of the stem inclosed in the cap and the lower end of the nut with the stem cut away. Fig. 3 shows an enlargement of the parts, (except stem being omitted) of Fig. 2, and the cap cut away. Fig. 4 shows a modified form in which the spring is held in the cap. Fig. 5 shows another modified form in which the spring is held by the nut. Fig. 6 is a plan view of the nut of Fig. 5.

Referring to details of the different forms and their parts. Figs. 1, 2 and 3 show my preferred form. In carrying out my invention, the nut as shown in the enlarged Fig. 3 is preferably stamped from sheet metal, and is threaded to fit the standard air inlet stem of a tire, this nut has an extended neck 7 which terminates at the outer end of the neck with an annular shoulder 8, thus forming a recess between the shoulder and top of the larger part of the nut. Mounted on this neck and in the recess is an annular spring 2, this spring is formed with a series of prongs separated by slots 9. This spring is split and is mounted in the recess by expanding it over shoulder 8, it snaps into position filling the recess and is held in place by the shoulder 8. The cap 4 is drawn from very thin sheet metal and is formed at its open end with two annular grooves, the lower groove is intended to fit snugly over the raised portion of the spring 2, the upper groove is to add strength and ornamentation. The operation is to first screw the nut, provided with the spring, on stem 3, then push the cap downward against the tension of the spring and when the bottom of the cap seats itself in recess 10 of the nut, the groove 5 of the cap will register with the raised portion 6 of the spring and the spring having thus contracted by the operation will again expand and cause the raised portion to bear firmly in the groove, thereby holding the cap and nut detachably connected together. To remove the cap, it is simply pulled off, thus making a very quick and simple means of attaching and detaching the cap from the nut, the nut being intended to remain on the stem, except when the tire is removed. This is a decided convenience and much less expensive than the old plan of using a threaded cap to screw on and off. The metal for a threaded cap must necessarily be very much heavier to allow for threads and where millions of the caps are used a large saving is effected in metal. Doing away with the slow process of screwing the caps on and off is of no less importance. In Fig. 4 the cap 14 is provided with an annular spring which is carried by the cap being fitted in the groove 15 of the cap. This spring is formed with prongs 11 that extend downward; these prongs have a raised portion 16. The nut is formed with a neck and annular exterior head 12. In the operation of this form the cap is pressed downward in the same manner as in the preferred form and the raised portion 16 of the spring 17 registers with and clamps the bead 12, thus holding the cap and nut detachably connected. In Fig. 5 the spring is formed with an annular flange 18 and prongs 19 and raised portion 20. The cap 21 is formed with an annular groove 22. The nut 23 is perforated to allow the prongs to enter when mounting the spring on the nut. The operation of this modified form is the same as in the preferred form, the principal change in form being in the spring and its mounting on the nut 23.

My invention is intended to broadly cover a combined dust cap and nut for an air inlet stem of a tire, that has metallic spring means which bear directly against the nut and against the inner side wall of the cap to detachably connect the cap and nut together for the purpose described.

What I claim is:

1. Means of protecting an air inlet stem of a tire, comprising a nut, a cap and spring means, said spring means in the form of a slotted band, said nut adapted to be secured upon said stem, said spring means seated upon said nut and means adapted to prevent displacement of the spring means therefrom, said cap adapted to detachably engage said spring means for the purpose described.

2. Means of protecting an air inlet stem of a tire, comprising a nut, spring means and a cap, said nut adapted to be secured upon said stem, said spring means adapted to be mounted upon said nut, the spring means having prongs, said prongs having a raised portion, said cap having a groove and the groove adapted to engage said raised portion, whereby the cap may be detachably connected to the nut, for the purpose described.

3. Means of protecting an air inlet stem of a tire, comprising a nut, spring means and a cap, said nut having a narrow outwardly extended neck and an external recess in said neck, said spring means having prongs and mounted in said recess, said cap having an inner groove adapted to coengage said spring means, said cap below said groove having a straight internal and external wall continued to its open end.

4. Means of protecting an air inlet stem of a tire, comprising a nut having an outwardly extended neck, spring means and a cap, said spring means in the form of a slotted band and adapted to be mounted upon said neck, said cap having an inner groove and adapted to slidably press over said neck and engage the spring means for the purpose described.

5. In a dust cap and nut for an air inlet stem of a tire, a nut adapted to be secured upon the stem, said nut formed with an outer extending neck, an exterior recess formed on said neck, spring means mounted in said recess, said spring means having prongs, a cap having an inner groove near its lower end, said cap adapted to be pressed upon and over the spring means and the groove of the cap engage the spring means whereby the cap and nut may be held detachably connected.

6. In a dust cap and nut for an air inlet stem of a tire, a nut adapted to be secured upon the stem, said nut formed with an outer extended neck, an annular exterior recess formed on said neck, annular spring means mounted in said recess, said spring means having a raised portion, a cap having an inner groove near its lower end, said cap adapted to be pressed upon and over said spring means and the groove of the cap engage said raised portion whereby the cap may be held detachably connected to said nut.

In testimony whereof I have hereunto set my hand at Los Angeles, California, this 12th day of February, 1919.

JUNIUS A. BOWDEN.